United States Patent
Suen et al.

(10) Patent No.: US 7,103,581 B1
(45) Date of Patent: Sep. 5, 2006

(54) SYSTEM AND METHOD FOR PRICING PRINT JOBS

(75) Inventors: Lawrence Suen, San Jose, CA (US); Kurt P. Brown, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1097 days.

(21) Appl. No.: 09/759,649

(22) Filed: Jan. 12, 2001

Related U.S. Application Data

(60) Provisional application No. 60/176,397, filed on Jan. 13, 2000.

(51) Int. Cl.
 *G06F 17/00* (2006.01)
 *G06G 7/00* (2006.01)
(52) U.S. Cl. ............... 705/400; 382/124; 382/284; 347/2; 347/3; 347/55; 347/106
(58) Field of Classification Search ......... 345/589, 345/604; 356/402; 382/100, 162; 705/400; 715/526, 527, 528
See application file for complete search history.

(56) References Cited

U.S. PATENT DOCUMENTS

| | | | | |
|---|---|---|---|---|
| 4,233,663 A | * | 11/1980 | Sugawara et al. ......... | 358/296 |
| 4,422,765 A | * | 12/1983 | Hoffman ................ | 356/432 |
| 5,204,699 A | * | 4/1993 | Birnbaum et al. ........ | 347/131 |
| 5,383,129 A | * | 1/1995 | Farrell ................ | 705/400 |
| 6,196,663 B1 | * | 3/2001 | Wetchler et al. ......... | 347/43 |
| 2001/0013939 A1 | * | 8/2001 | Weaver et al. .......... | 358/1.9 |
| 2005/0007621 A1 | * | 1/2005 | Barry et al. ........... | 358/1.14 |

FOREIGN PATENT DOCUMENTS

WO    WO 99/36835 A1   *   7/1999

OTHER PUBLICATIONS

Stone: "Color Printers: A Spectrum of Possibilities", PC Magazine, Nov. 23, 1993, vol. 12, No. 20, p. 233(16).*

* cited by examiner

*Primary Examiner*—John W. Hayes
*Assistant Examiner*—Rutao Wu

(57) ABSTRACT

A system and method are disclosed for estimating the amount of ink required for a specific print job. For example, the amount of ink for a particular color for a specific print job may be estimated. This estimation can be used for various applications such as predicting the cost of a particular print job.

16 Claims, 6 Drawing Sheets

SYSTEM AND METHOD FOR PRICING PRINT JOBS

CROSS REFERENCE TO RELATED APPLICATIONS

This application claims priority to U.S. Provisional Patent Application No. 60/176,397, filed Jan. 13, 2000 entitled SYSTEM AND METHOD FOR PROVIDING A MAILING SERVICE by BROWN et al., which is incorporated herein by reference.

FIELD OF THE INVENTION

The present invention relates generally to document printing. In particular, it relates to a system and method for pricing a print job.

BACKGROUND OF THE INVENTION

Today, the price of printing a document typically varies only a limited amount, often having only two pricing tiers: black and white or color. Occasionally, the pricing scheme varies depending on the number of colors required to print the document. For example, a document requiring three different colors would cost more than a document requiring only two. These pricing schemes are typically not an accurate reflection of the true cost of printing a specific document. For example, a document designed mostly in black and white with a single small splash of color in the logo may cost the customer the same price as a document designed with a large full color picture, even though the second document requires substantially more ink than the first document. As a result, the customer may end up paying more than he should for the printing of his document, or alternatively, a merchant may end up charging less than he should to cover the cost of printing a document. This creates two problems for the printing business. There is a cost barrier for their customers, limiting the market to customers willing to pay the premium price or customers doing full color jobs. Another problem is the inability of the print provider to control their profit margins.

What is needed is a system and method for pricing a print job so as to more accurately reflect the true cost of the print job. The present invention addresses such needs.

SUMMARY OF THE INVENTION

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, the amount of ink required for a specific print job may be estimated. For example, the amount of ink for a particular color for a specific print job may be estimated. This estimation can be used for various applications such as predicting the cost of a particular print job.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
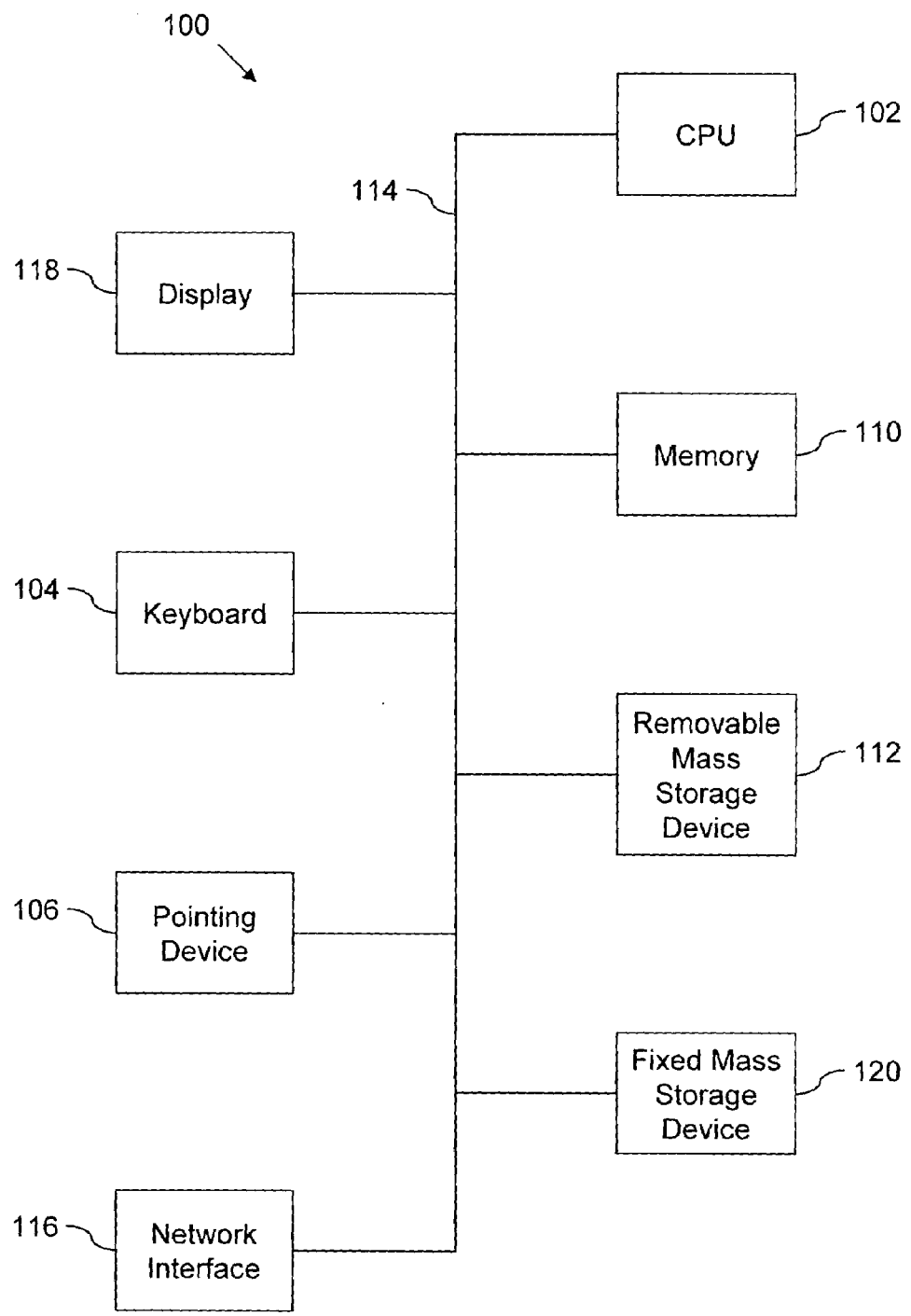
FIG. 1 is a block diagram of a general purpose computer system suitable for carrying out the processing in accordance with one embodiment of the present invention.

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

According to an embodiment of the invention, a method for pricing a print job comprises providing an approximate amount of ink associated with the print job; and pricing the print job, wherein the pricing is associated with the approximate amount of ink.

In another embodiment, a system for pricing a print job is also disclosed. The system comprises a processor configured to price a print job when an approximate amount of ink associated with a print job is provided, wherein the pricing is associated with the approximate amount of ink; and a memory coupled with the processor, the memory being configured to provide the processor with instructions.

In yet another embodiment, a computer program product for pricing a print job is also disclosed. The computer program product is embodied in a computer readable medium and comprising computer instructions for providing an approximate amount of ink associated with the print job; and pricing the print job, wherein the pricing is associated with the approximate amount of ink.

According to another embodiment of the invention, a method for estimating a cost of a print job comprises receiving a document; converting the document into a predefined color space; and estimating an amount of ink for a color associated with the document. The method further comprising determining a price of printing a project associated with the document, wherein the price is a function of the estimation of the amount of ink. The estimating the amount of ink for a color associated with the document is automatically performed. The amount of ink for a color is estimated by summing a color value number for the color for each pixel of the document to obtain a total color value number; and multiplying the total color value number by the size of a pixel to obtain an ink coverage value associated with the color.

A cost multiplier can be determined with units of currency per color inch$^2$. The cost multiplier can be multiplied with an ink coverage value associated with the color, wherein a method for determining the cost multiplier comprises providing a first ink coverage value of a color for a first document; printing the first document on a printer until the printer runs out of an ink cartridge of the color; deriving a second ink coverage value associated with the ink cartridge of the printer; and dividing a cost of the ink cartridge by the ink coverage value of the ink cartridge.

In another embodiment, a system for estimating a cost of a print job is disclosed. The system comprises a processor configured to receive a document; convert the document into a predefined color space; and estimate an amount of ink for a color associated with the document. The system also including a memory configured to provide instructions to the processor.

In yet another embodiment, a computer program product for estimating a cost of a print job is disclosed. The computer program product is embodied in a computer readable medium and comprises computer instructions for receiving a document; converting the document into a predefined color space; and estimating an amount of ink for a color associated with the document.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
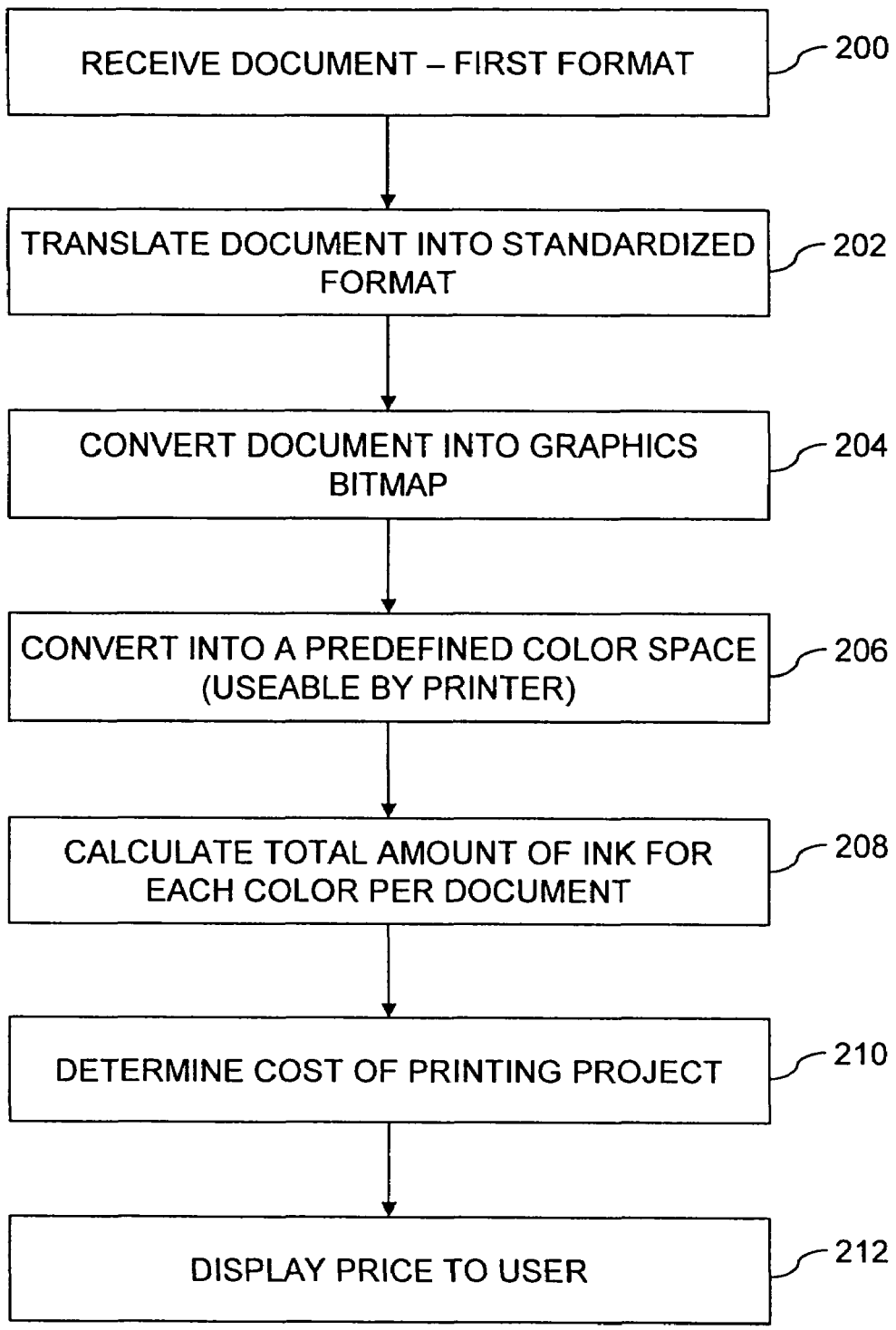
FIG. 2 is a flow diagram of a method according to an embodiment of the present invention for estimating a cost of a print project.

FIG. 2 is a flow diagram of a method according to an embodiment of the present invention for estimating a cost of a print job. In this example, a document in a first format is received (step 200). For example, a document in a first format may be document in the original format in which it is received. An original format document can be a document that is used by customers to design their document and then submitted to the print provider for printing. They are usually documents generated by word processing and graphics design applications. For example, a customer may request a print job for a document that is formatted in Microsoft Word, Publisher, or Adobe PDF. Examples of how such a document can be received is if the customer up-loads the document onto a computer or server provided by the print service provider using HTTP upload or FTP protocol, or send the print service provider a physical medium containing the document such as floppy disk, ZIP disk or a recordable CD.

This document can then be translated into a standardized format (step 202). The standardized format can be any format selected by the service provider, such as Adobe PDF, PostScript, or PCL. In this manner, the customer can submit a document in whatever format he prefers without worrying about compatibility with the system used by the print provider. The standardized format can be any format but it is preferable to use a print oriented format such as Adobe PDF, PostScript, or PCL. A print oriented format includes any format that can be used to draw a document onto a screen or onto a printer without any additional inputs (for example, all the graphics, text and formatting information are all incorporated) and the formatting information can be displayed in a predetermined manner. Translation of a high level format such as Microsoft Word into a print oriented format such as PostScript is typically performed when a document is sent from the computer to a printer to produce a printout.

The document is then converted into a graphics bitmap (step 204). Conversion of the document into a graphics bitmap creates an image of what will be printed. For example, when a PDF document is displayed on a computer monitor, it typically converts the document (which could contain color information in Red-Green-Blue or Cyan-Magenta-Yellow-Black or other color space) to a bitmap so that the user can view it in the Red, Green, and Blue (RGB) color space in which each pixel has values corresponding to an amount (or intensity) of Red, Green, and Blue. This conversion may be performed with a publicly available software such as the Adobe Acrobat Plug-In API.

The graphics bitmap is then converted into a predefined color space (step 206). An example of the predefined color space is the color space of the target print device. For example, if an HP8500 color laser jet printer is being used, then the RGB color space can be converted to a cyan, magenta, yellow, black (CMYK) color space (the color space used by the HP8500 printer). Typically, computer monitors and printers use different technologies to show images. Computer monitors produce images by using three separate electron beams that produces Red, Green and Blue while printers typically generate images by placing different amounts of ink of different colors such as Cyan, Magenta, Yellow and Black.

There are various methods of this conversion, such as rough approximation, color rendering dictionaries, look-up-tables, ICC profiles, etc. These different methods vary in their accuracy and computational requirements. These methods are well known in the art.

Various printers use various colors including a varying number of colors, depending on the brand of the printer. Regardless of what colors are being used by the printer, different colored inks typically cost different amounts of money.

The total amount of ink for each color per document is then calculated (step 208). Alternatively, the total amount of ink for each color per page can be calculated, then the total amount of ink per color per page added for all the pages. Another approach is to consider the entire document a single large page and calculate the total amount of ink for each color per "page". The cost of printing the project is the determined (step 210). Details of calculating the total amount of ink per document and determining the cost of printing the project are later discussed in conjunction with FIGS. 4A, 4B, 5, and 6. A price is the displayed (step 212).

Figure 3:
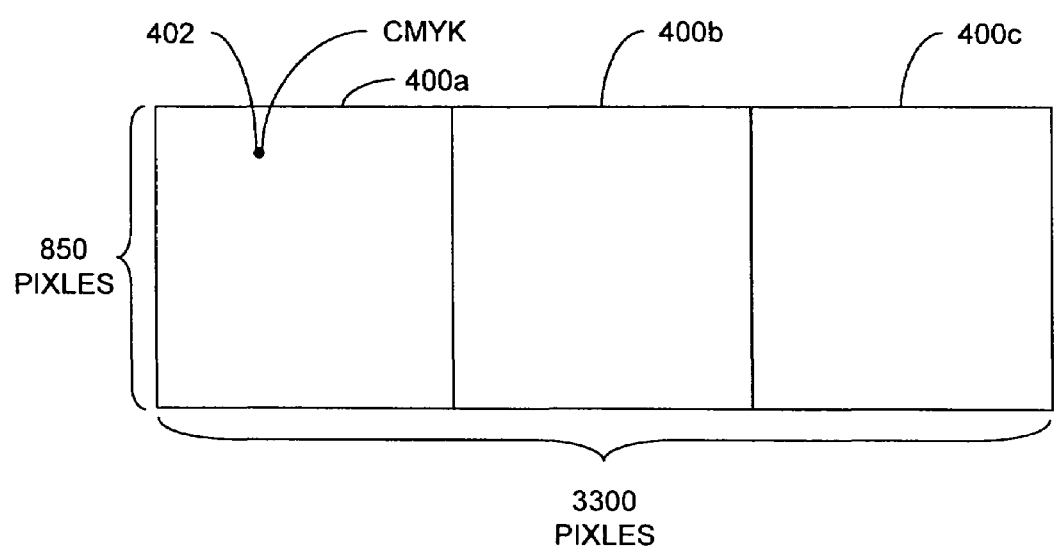
FIG. 3 is an example of a document to be printed, broken down into pixels.

FIG. 3 is an example of a document broken down in pixels. In this example, a document submitted for printing has three pages 400A–400C. All of the pages in the submitted document can be considered one large page for purposes of calculating the amount of ink used in the document. In this example, the document can be thought of a one large page of 850 pixels×3300 pixels. Each pixel 402 may have a value for amount of each ink color used by the printer. In this example, each pixel 402 can have a value for cyan, a value for magenta, a value for yellow, and a value for black.

Figure 4A:
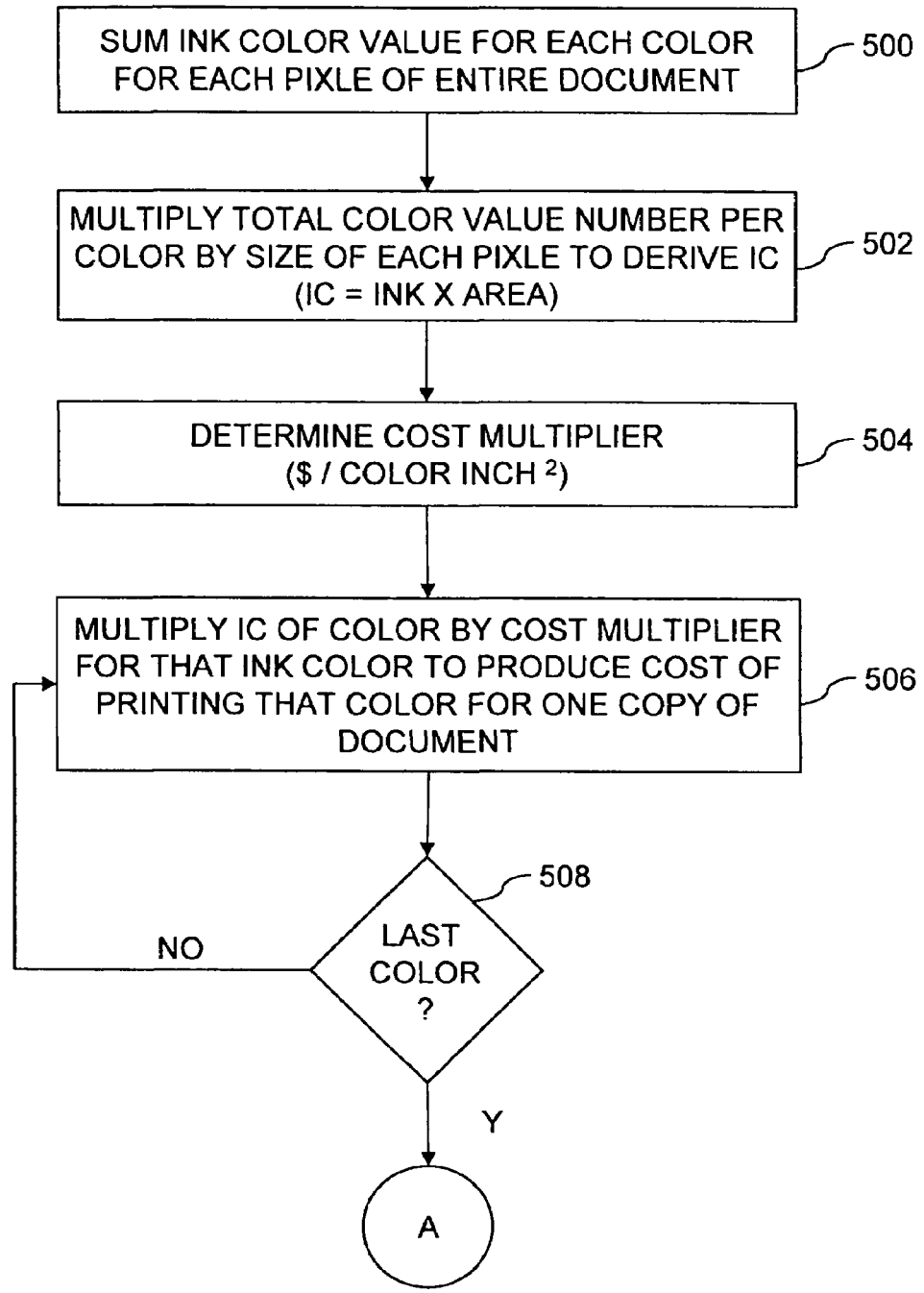
FIGS. 4A–4B are flow diagrams according to the embodiment of the present invention for calculating the total amount of ink for each color per page and determining a cost of printing the project.
Figure 4B:
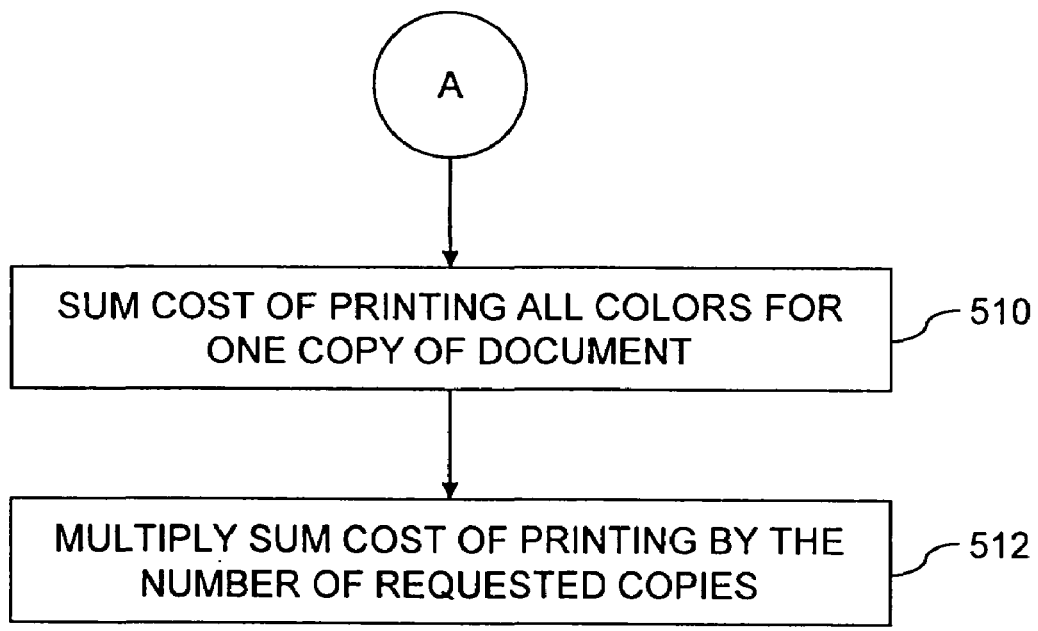

FIGS. 4A–4B show a flow diagram of a method according to an embodiment of the present invention for calculating a total amount of ink of each ink color required for a document and determining the cost of the print job, such as steps 208 and 210 of FIG. 2. An ink color value number for each ink color for each pixel of the entire document is summed (step 500). The color value number for each ink color for each pixel indicates approximately how much ink is used for each pixel. Each pixel has four ink color value numbers associated with it in this example, one for each of the four ink colors CMYK. For example, each ink color can use eight bits ranging from 0 to 255, indicating its color intensity. In this example, each pixel can use 32 bits to represent ink colors for each pixel. The amount of ink a printer uses on a pixel will be proportional to the ink color value number associated with that pixel. These ink color value numbers can be summed for each ink color for each pixel of the entire document. Preferably, the ink color value numbers summed for each ink color for each pixel is summed for the entire document rather than summed per page, although they can be summed per page and the sums for the page can be added up to a total for the document. These ink color value numbers per pixel can be derived when the document is converted from the graphics bitmap into the predefined color space, such as the color space of the print device, such as steps 204 and 206 of FIG. 2. Extracting the ink color value number per pixel during the conversion of a graphics bitmap into a predefined color space is well known in the art.

The total color value number per color is then multiplied by the size of each pixel to derive an ink coverage value (IC) (IC=ink×area) (step 502). An example unit of measurement used for IC is square inches of color. The size of each pixel can be derived from the bitmap of the document. For example, if the document is 3300 pixels×850 pixels, such as the document shown in FIG. 3, then each pixel dimension equals 0.01×0.01 inches, assuming the example shown in FIG. 3 is a three page document with 8.5 inches×11 inches per page.

A cost multiplier is determined (step 504). The cost multiplier can be determined in advance. The unit of the cost multiplier is dollars per square inch of ink. Details of determining the cost multiplier are discussed in conjunction with FIG. 5.

The IC of a certain ink color is multiplied by the cost multiplier for that ink color to produce a cost of printing that particular ink color for one copy of the requested document (step 506). The following is an example of IC of a color multiplied by a cost multiplier for that ink color for each ink color of a printer.

(IC of Cyan)×(multiplier for Cyan)+(IC of Magenta)×(multiplier for Magenta)+(IC of Yellow)×(multiplier for Yellow)+(IC of Black)×(multiplier of Black)=cost of printing one copy of requested document.

It is then determined whether the selected ink color is the last ink color (step 508). If the selected ink color is not the last ink color, then the IC of the next ink color is then multiplied by the cost multiplier for that color to produce the cost of printing that ink color for one copy of the document (step 506). If, however, the selected ink color is the last ink color, then the cost of printing all ink colors are summed for one copy of the document (step 510). The sum cost of the printing of one copy of the document is then multiplied by the number of requested copies to derive the total cost of the ink required by the print project (step 512).

A price quoted to a user may be derived from the cost of the ink required by the print job. For example, a vendor may wish to add a profit margin into each multiplier for a particular ink color before deriving the total price quoted to the customer.

Figure 5:
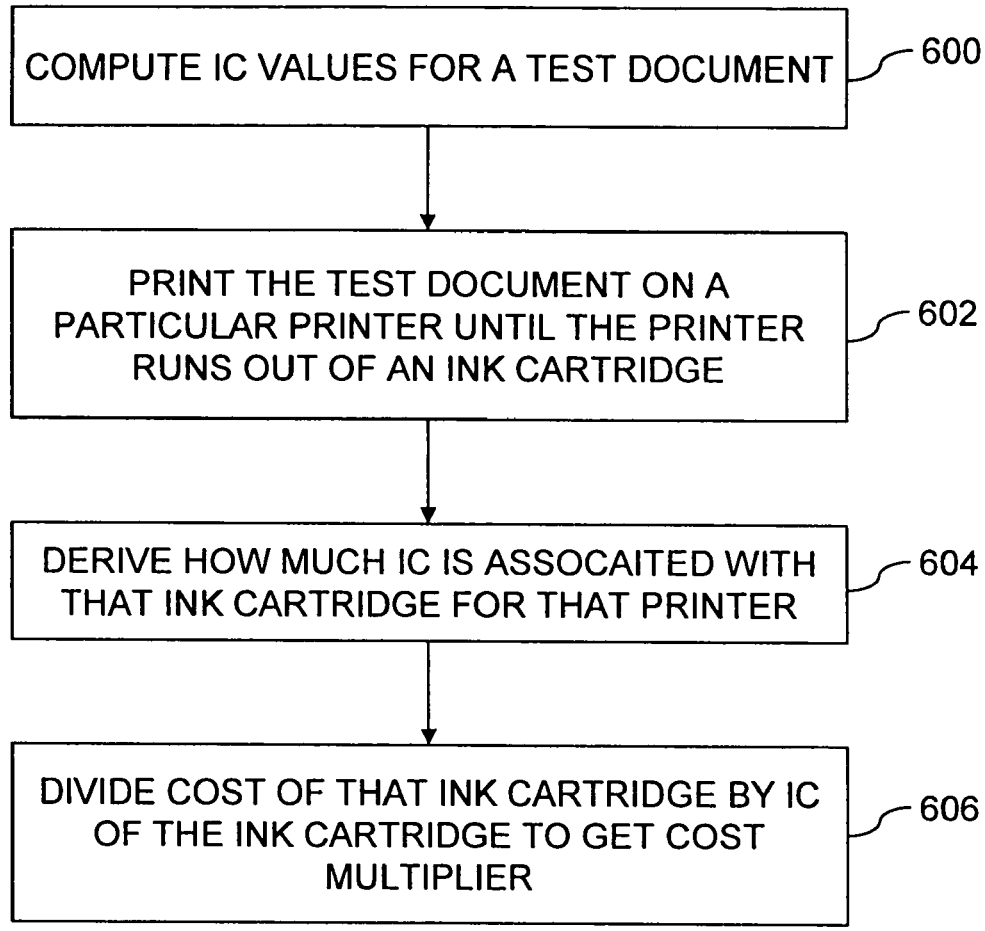
FIG. 5 is a flow diagram of a method according to an embodiment of the present invention for calculating a cost multiplier.

FIG. 5 is a flow diagram of a method according to an embodiment of the present invention for determining a cost multiplier for a particular color ink cartridge. An IC value is computed for a test document (step 600). The IC value can be computed as in step 502 of FIG. 4A. The test document can be printed on a particular printer until the printer runs out of an ink cartridge (step 602). How much IC is associated with that ink cartridge for that particular printer can be derived (604). The cost of that ink cartridge is then divided by the IC of the ink cartridge to get the cost multiplier for that ink color for that specific printer (step 606).

For example, if a particular ink cartridge ran out after two thousand copies of the test document, then the following calculation may apply to derive how much IC there is in that ink cartridge. If the IC values for the test document are the following, C=50, M=60, Y=70, K=30, and if the cyan ink cartridge ran out after two thousand copies of this test document, than 50×2,000=100,000=IC for the cyan cartridge for that particular printer. If the cyan cartridge costs fifty dollars, than the cyan will cost $50.00 per 100,000 IC. So $50.00 divided by 100,000 IC=$0.0005 per IC for cyan for this particular printer.

Figure 6:
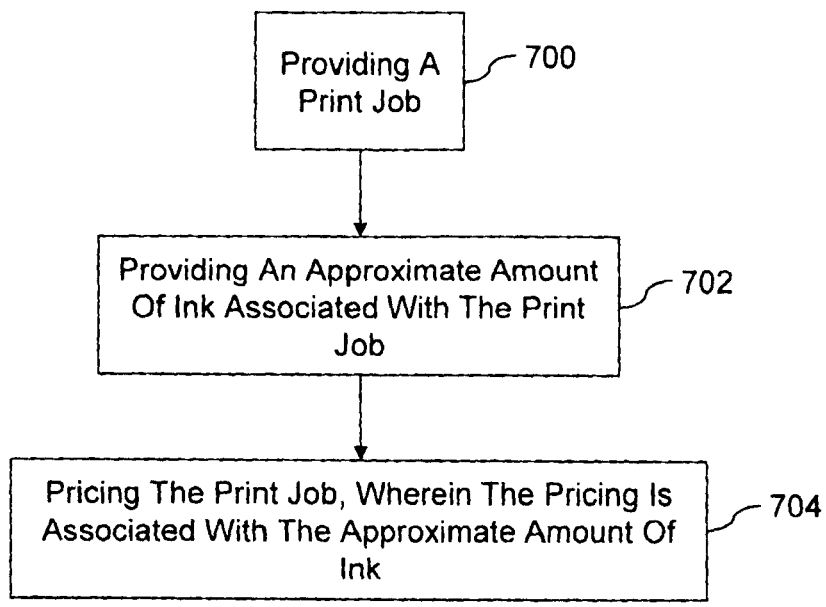
FIG. 6 is a flow diagram of a method according to an embodiment of the present invention for pricing a print job.
Figure 6:
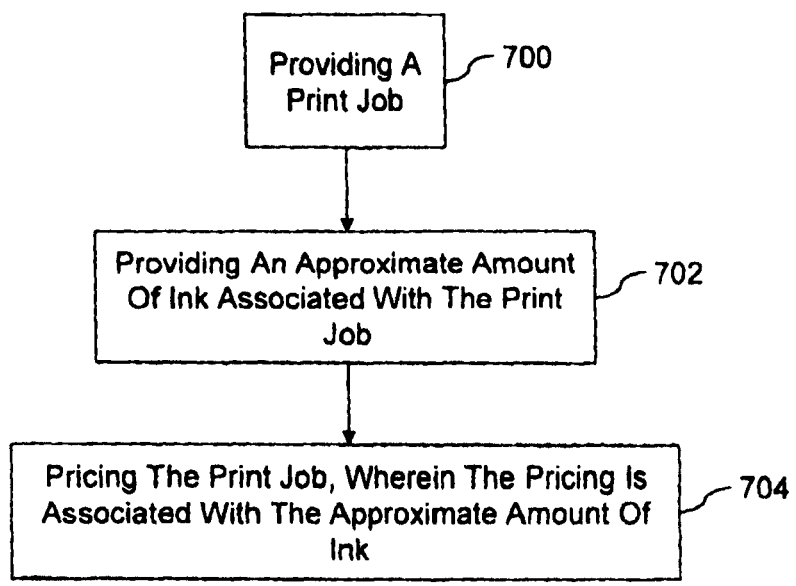

FIG. 6 is a flow diagram of a method according to an embodiment of the present invention for pricing a print job. The present invention is particularly well suited to digital printing jobs since the cost of ink is a substantial part of the cost of printing a document. In this example, a print job is provided (step 700). For example, a customer might electronically upload a document for possible printing by the print service provider. Alternatively, a customer might simply inform the print service provider enough specific details regarding a print job to be able to price the print job. An approximate amount of ink associated with the print job is provided (step 702). The approximate amount of ink can be the exact amount of ink required by the print job or a rough estimate of the amount of ink required by the print job. An example of obtaining the approximate amount of ink associated with the print job is someone other than the print service provider providing the information to the print service provider, such as the customer informing the print provider how much ink is required for the print job. Alternatively, the amount of ink needed for the print job can be estimated by an automated method such as the method described in conjunction with FIGS. 2, 3, 4A, 4B, and 5. The print job is priced, wherein the price of the print job is associated with the approximate amount of ink (step 704).

A method and system for estimating a cost of a print job has been disclosed. Software written according to the present invention may be stored in some form of computer-readable medium, such as memory or CD-ROM, or transmitted over a network, and executed by a processor.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

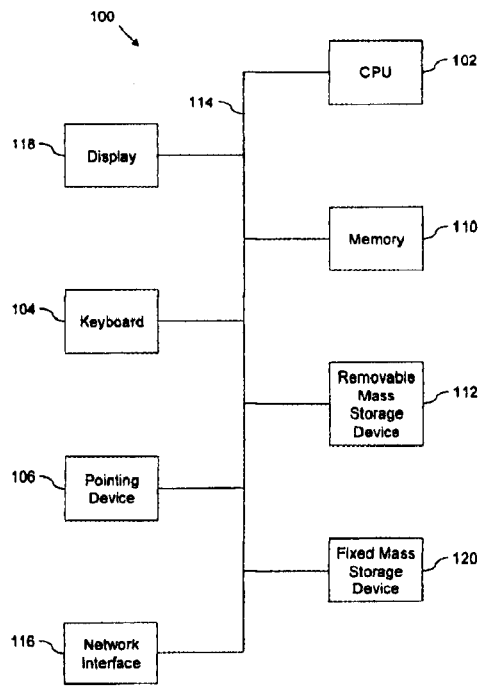

What is claimed is:

1. A system for pricing a print job comprising:

a processor configured to price a print job when an approximate amount of ink coverage associated with a print job is estimated, wherein the amount of ink coverage for each color is estimated by summing a color value number for the color for each pixel of the document to obtain a total color value number and multiplying the total color value number by the size of a pixel to obtain an ink coverage value associated with the color, wherein for each color, a cost multiplier for the color is multiplied with an ink coverage value associated with the color to obtain a cost of the ink for the color and, wherein the pricing is associated with the cost of ink for each color; and a memory coupled with the processor, the memory being configured to provide the processor with instructions for controlling the processor to price the print job.

2. The system of claim 1 wherein the processor is further configured to determine the cost multiplier, determining the cost multiplier comprising:

providing a first ink coverage value of a color for a first document;

printing the first document on a printer until the printer runs out of an ink cartridge of the color;

deriving a second ink coverage value associated with the ink cartridge of the printer, wherein the second ink coverage value is derived from the first ink coverage value and the number of times the first document in printed before the printer runs out of the ink cartridge; and dividing a cost of the second ink cartridge by the ink coverage value of the ink cartridge.

3. A computer program product for pricing a print job, the computer program product being embodied in a computer readable medium and comprising computer instructions for:

estimating an approximate amount of ink coverage associated with the print job, wherein the amount of ink coverage for each color is estimated by summing a color value number for the color for each pixel of the document to obtain a total color value number and multiplying the total color value number by the size of a pixel to obtain an ink coverage value associated with the color;

for each color, multiplying a cost multiplier for the color with an ink coverage value associated with the color to obtain a cost of the ink for the color; and pricing the print job, wherein the pricing is associated with the cost of ink for each color.

4. The computer program product of claim 3 further comprising computer instructions for determining the cost multiplier, the computer instructions comprising:

providing a first ink coverage value of a color for a first document;

printing the first document on a printer until the printer runs out of an ink cartridge of the color;

deriving a second ink coverage value associated with the ink cartridge of the printer, wherein the second ink coverage value is derived from the first ink coverage value and the number of times the first document in printed before the printer runs out of the ink cartridge; and dividing a cost of the second ink cartridge by the ink coverage value of the ink cartridge.

5. A system for estimating a cost of a print job comprising:

a processor configured to receive a document; convert the document into a predefined color space; and estimate an amount of ink for a color associated with the document, wherein the amount of ink coverage for the color is estimated by summing a color value number for the color for each pixel of the document to obtain a total color value number and multiplying the total color value number by the size of a pixel to obtain an ink coverage value associated with the color, wherein a cost multiplier for the color is multiplied with an ink coverage value associated with the color to obtain a cost of the ink for the color, and wherein the cost of the print job is associated with the cost of ink for each color; and a memory configured to provide instructions to the processor for controlling the processor to receiving the document, converting the document into the predefined color space, and estimating the amount of ink.

6. The system of claim 5 wherein the processor is further configured to determine the cost multiplier, determining the cost multiplier comprising:

providing a first ink coverage value of a color for a first document;

printing the first document on a printer until the printer runs out of an ink cartridge of the color;

deriving a second ink coverage value associated with the ink cartridge of the printer, wherein the second ink coverage value is derived from the first ink coverage value and the number of times the first document in printed before the printer runs out of the ink cartridge; and dividing a cost of the second ink cartridge by the ink coverage value of the ink cartridge.

7. The system of claim 5 wherein the document is received in a first format and the processor is further configured to translate the document into a second format.

8. The system of claim 5 wherein the processor is further configured to convert the received document into a graphics bitmap.

9. The system of claim 5 wherein the document has a plurality of colors associated with the document and the processor is further configured to estimate an amount of ink coverage for each color associated with the document.

10. The system of claim 5 wherein the processor is further configured to:

price the print job, wherein the price is associated with the cost of ink for each color and display the price.

11. A computer program product for estimating a cost of a print job, the computer program product being embodied in a computer readable medium and comprising computer instructions for:

receiving a document;

converting the document into a predefined color space; and estimating an amount of ink for a color associated with the document, wherein the amount of ink coverage for each color is estimated by summing a color value number for the color for each pixel of the document to obtain a total color value number and multiplying the total color value number by the size of a pixel to obtain an ink coverage value associated with the color;

for each color, multiplying a cost multiplier for the color with an ink coverage value associated with the color to obtain a cost of the ink for the color, wherein the cost of the print job is associated with the cost of ink for each color.

12. The computer program product of claim 11 further comprising computer instructions for determining the cost multiplier, the computer instructions comprising:

providing a first ink coverage value of a color for a first document;

printing the first document on a printer until the printer runs out of an ink cartridge of the color;

deriving a second ink coverage value associated with the ink cartridge of the printer, wherein the second ink coverage value is derived from the first ink coverage value and the number of times the first document in printed before the printer runs out of the ink cartridge; and dividing a cost of the second ink cartridge by the ink coverage value of the ink cartridge.

13. The computer program product of claim 11 wherein the document is received in a first format and further comprising computer instructions for translating the document into a second format.

14. The computer program product of claim 11 further comprising computer instructions for converting the received document into a graphics bitmap.

15. The computer program product of claim 11 wherein the document has a plurality of colors associated with the document and further comprising computer instructions for estimating an amount of ink coverage for each color associated with the document.

16. The computer program product of claim 11 further comprising computer instructions for:

pricing the print job, wherein the price is associated with the cost of ink for each color and displaying the price.

* * * * *

UNITED STATES PATENT AND TRADEMARK OFFICE
CERTIFICATE OF CORRECTION

| | | |
|---|---|---|
| PATENT NO. | : 7,103,581 B1 | Page 1 of 2 |
| APPLICATION NO. | : 09/759649 | |
| DATED | : September 5, 2006 | |
| INVENTOR(S) | : Lawrence Suen et al. | |

It is certified that error appears in the above-identified patent and that said Letters Patent is hereby corrected as shown below:

On the title page, change 6 drawings sheets to 7 drawings sheets.

The sheets of drawing consisting of figure 6 should be added after figure 5, as per attached figure 6.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,103,581 B1 |
| APPLICATION NO. | : 09/759649 |
| DATED | : September 5, 2006 |
| INVENTOR(S) | : Lawrence Suen et al. |

It is certified that error appears in the above-identified patent and that said Letters Patent is hereby corrected as shown below:

Delete the title page and substitute therefore the attached title page consisting of corrected number of drawing sheets.

The sheets of drawing consisting of figure 6 should be added after figure 5, as per attached figure 6.

This certificate supersedes the Certificate of Correction issued August 3, 2010.

Signed and Sealed this

Twenty-fourth Day of August, 2010

David J. Kappos
*Director of the United States Patent and Trademark Office*

CERTIFICATE OF CORRECTION (continued)

(12) United States Patent
Suen et al.

(10) Patent No.: US 7,103,581 B1
(45) Date of Patent: Sep. 5, 2006

(54) SYSTEM AND METHOD FOR PRICING PRINT JOBS

(75) Inventors: Lawrence Suen, San Jose, CA (US); Kurt P. Brown, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1097 days.

(21) Appl. No.: 09/759,649

(22) Filed: Jan. 12, 2001

Related U.S. Application Data

(60) Provisional application No. 60/176,397, filed on Jan. 13, 2000.

(51) Int. Cl.
G06F 17/00 (2006.01)
G06G 7/00 (2006.01)

(52) U.S. Cl. ............ 705/400; 382/124; 382/284; 347/2; 347/3; 347/55; 347/106

(58) Field of Classification Search ............ 345/589, 345/604; 356/402; 382/100, 162; 705/400; 715/526, 527, 528
See application file for complete search history.

(56) References Cited

U.S. PATENT DOCUMENTS

| | | | |
|---|---|---|---|
| 4,233,663 A | * | 11/1980 | Sugawara et al. .......... 358/296 |
| 4,422,765 A | * | 12/1983 | Hoffman .................. 356/432 |
| 5,204,699 A | * | 4/1993 | Birnbaum et al. ......... 347/131 |
| 5,383,129 A | * | 1/1995 | Farrell .................... 705/400 |
| 6,196,663 B1 | * | 3/2001 | Wetchler et al. ........... 347/43 |
| 2001/0013939 A1 | * | 8/2001 | Weaver et al. ............ 358/1.9 |
| 2005/0007621 A1 | * | 1/2005 | Barry et al. ............. 358/1.14 |

FOREIGN PATENT DOCUMENTS

WO    WO 99/36835 A1  *  7/1999

OTHER PUBLICATIONS

Stone: "Color Printers: A Spectrum of Possibilities", PC Magazine, Nov. 23, 1993, vol. 12, No. 20, p. 233(16).*

* cited by examiner

*Primary Examiner*—John W. Hayes
*Assistant Examiner*—Rutao Wu

(57) ABSTRACT

A system and method are disclosed for estimating the amount of ink required for a specific print job. For example, the amount of ink for a particular color for a specific print job may be estimated. This estimation can be used for various applications such as predicting the cost of a particular print job.

16 Claims, 7 Drawing Sheets